(12) United States Patent
Hoblit (10) Patent No.: US 8,443,298 B2
(45) Date of Patent: May 14, 2013

(54) METHOD AND APPARATUS FOR REPOSITIONING A HORIZONTALLY OR VERTICALLY MAXIMIZED DISPLAY WINDOW

(75) Inventor: Robert S. Hoblit, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 11/866,156

(22) Filed: Oct. 2, 2007

(65) Prior Publication Data
US 2008/0016461 A1 Jan. 17, 2008

Related U.S. Application Data

(63) Continuation-in-part of application No. 11/428,193, filed on Jun. 30, 2006, now abandoned.

(51) Int. Cl.
*G06F 3/048* (2006.01)
(52) U.S. Cl.
USPC .............................. 715/800; 715/788; 715/798
(58) Field of Classification Search .................. 715/788, 715/798, 800
See application file for complete search history.

(56) References Cited

U.S. PATENT DOCUMENTS

| 5,473,745 | A | * | 12/1995 | Berry et al. ..................... 715/788 |
| 5,586,243 | A | * | 12/1996 | Barber et al. .................. 715/856 |
| 5,751,283 | A | | 5/1998 | Smith |
| 5,760,772 | A | | 6/1998 | Austin |
| 5,828,351 | A | * | 10/1998 | Wu ............................... 715/700 |
| 6,297,837 | B1 | | 10/2001 | Bogdan |
| 6,456,305 | B1 | | 9/2002 | Qureshi et al. |
| 6,826,727 | B1 | | 11/2004 | Mohr et al. |
| 7,480,872 | B1 | * | 1/2009 | Ubillos ......................... 715/838 |
| 2002/0054133 | A1 | * | 5/2002 | Jameson ........................ 345/788 |
| 2006/0001650 | A1 | * | 1/2006 | Robbins et al. ............... 345/173 |
| 2006/0218502 | A1 | | 9/2006 | Matthews et al. |
| 2006/0253796 | A1 | * | 11/2006 | Wang et al. ................... 715/788 |
| 2007/0006095 | A1 | | 1/2007 | Feng |

FOREIGN PATENT DOCUMENTS

| JP | 2000284880 A | * | 10/2000 |
| WO | 02066739 A1 | | 10/2002 |

OTHER PUBLICATIONS

JP2000284880A, English Machine Transtation Version, pp. 1-10.*

* cited by examiner

*Primary Examiner* — Weilun Lo
*Assistant Examiner* — Truc Chuong
(74) *Attorney, Agent, or Firm* — Thomas E. Tyson; Jeffrey L. Streets (57) ABSTRACT

A method, apparatus, and computer usable program to reposition a display window that has been adjusted along a dimension. The method includes displaying a display window on a desktop, the display window having a first boundary, a second boundary opposite the first boundary, a third boundary about perpendicular to the first boundary, and a fourth boundary opposite the third boundary. The method further includes receiving a resize command and, responsive to receiving the resize command, moving the first boundary with respect to a first window limit and moving the second boundary with respect to a second window limit. The method includes receiving a reposition command and, responsive to receiving the reposition command, moving the third and fourth boundaries of the resized display window while maintaining the fixed distance between the third and fourth boundaries and maintaining the position of the first and second boundaries with respect to the first and second window limits.

17 Claims, 7 Drawing Sheets

METHOD AND APPARATUS FOR REPOSITIONING A HORIZONTALLY OR VERTICALLY MAXIMIZED DISPLAY WINDOW

This application is a continuation-in-part of U.S. patent application Ser. No. 11/428,193 filed on Jun. 30, 2006.

BACKGROUND OF THE INVENTION

1. Field of the Invention

The present invention relates generally to an improved data processing system. More specifically, the present invention provides a computer implemented method, apparatus, and computer usable program product to adjust window heights or widths on displays for data processing systems.

2. Description of the Related Art

Developers of computers in the late 1970s and early 1980s created a desktop metaphor for interacting with data processing systems. The desktop metaphor allows a user to view one or more windows within which a user interacts with a program. Behind the one or more windows is a "desktop" that can show a picture or some other background, along with a number of icons representing shortcuts to executable files or other files.

Over time, quality of displays used to display desktop windows increased. A chief metric of the quality of a display is the number of picture elements, or pixels, the display can show. A high number of pixels allow a display to show more detail along each dimension of a displayed virtual object. A dimension is the length of a virtual object in a particular direction. At a time when displays having 640 pixel width by 480 pixel height were state of the art, many user interface developers began designing data processing systems to display multiple program outputs. For each user interface program that a developer envisioned to operate simultaneously, the developer assigned the data processing system the task of showing a display window.

A display window can be characterized as a panel within a display or video memory. The panel is often rectangular, though the panel can have any shape. Within the panel is displayed the output of a program or data. Output includes text written by a user, data output by a program, a program's user interface, a data file name, or any other output of a program or data processing system hardware.

Rectangular display windows, the most common type of display window, have two boundaries that are generally parallel to each other. In addition, rectangular display windows have two other boundaries that are about perpendicular to the first two boundaries. Boundaries are about perpendicular even though a rounded corner may join each boundary. The term about perpendicular means that two boundaries intersect at an angle within a few degrees of 90 degrees.

A program for controlling a display window provides many ways for a user to adjust the size and placement of the display window within the display. For most of the era that desktop metaphor data processing systems have been popular, the maximum size of a display has been under 1,000 pixels on a side. Under such circumstances, developers realized that displays were inadequate to display more than a fraction of a file that a user desired to see. Consequently, developers provided a quick mechanism to enlarge a display window to occupy most, if not all, of the visible screen. At the time, developers created a maximize button, which is usually displayed in the upper right hand corner of the display window. A user that clicks on a maximize button triggers the data processing system to enlarge a display window to cover substantially the entire visible display.

As time progressed display technology advanced such that displays could show over 1,000 pixels on a side. Unfortunately, in the case of many settings of word processing programs, a fully enlarged display window either leaves significant fractions of the display window blank, or crowds out other display windows that benefit the user. Display areas tend to be better utilized if a word processing program displays a display window that is relatively tall and narrow in the height and width dimensions, respectively. In this context, "tall" means a display window that extends about to the top and bottom of the screen from the perspective of the user. In this context, "narrow" means the window width is either not as large as the window height dimension, or the window width does not extend to about each side of a display from the perspective of the user.

However, users must resort to the manual use of a mouse to size and position a display window that is tall and narrow, as described above. A user can feel compelled to leave desktop space available for additional display windows, but at the cost of exerting these additional movements and clicks. As a result, users are frustrated by the need to make adjustments extending a display window to a desired size quickly and efficiently.

Consequently, users would be less frustrated if users could rapidly stretch a display window along a single dimension. In addition, users would be less frustrated if users could restore display windows back to an original size or to a former size.

SUMMARY OF THE INVENTION

Illustrative embodiments described herein provide for a method, apparatus, and computer usable program to adjust a display window along a dimension. The method includes displaying a display window on a desktop, the display window having a first boundary, a second boundary opposite the first boundary, a third boundary about perpendicular to the first boundary, and a fourth boundary opposite the third boundary. The method further includes receiving a resize command to resize the display window. In response to receiving the resize command, the method includes moving the first boundary with respect to a first window limit and moving the second boundary with respect to a second window limit. The distance between the third boundary and the fourth boundary remains fixed. Furthermore, with the first and second boundaries having been moved with respect to the first and second window limits, the method may include receiving a reposition command to reposition the third and fourth boundaries of the display window while maintaining the fixed distance between the third and fourth boundaries and maintaining the position of the first and second boundaries with respect to the first and second window limits.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
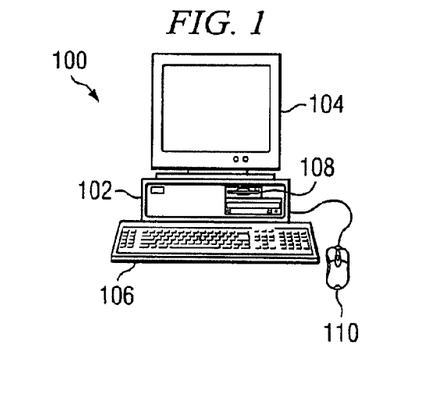
FIG. 1 is diagram of a data processing system in which embodiments on the invention may be implemented.

FIG. 1 shows a pictorial representation of a data processing system in which the aspects illustrative embodiments may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer® computer or IntelliStation® computer, which are products of International Business Machines Corporation®, located in Armonk, N.Y. Although the depicted representation shows a computer, other illustrative embodiments may be implemented in other types of data processing systems, such as a network computer. Computer 100 also preferably includes a graphical user interface (GUI) that may be implemented by means of a program residing in computer readable media in operation within computer 100. The graphical user interface may implement a desktop metaphor.

Figure 2:
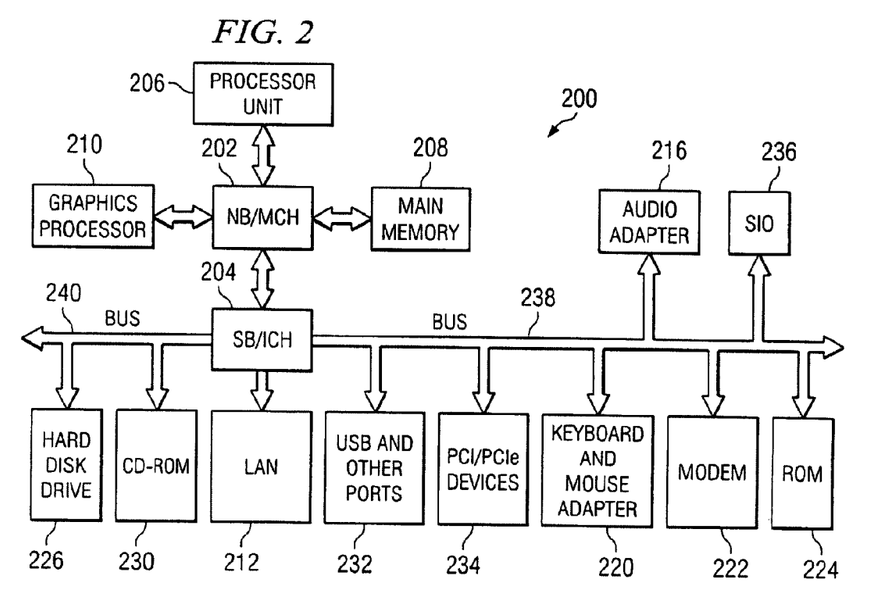
FIG. 2 is a block diagram of a data processing system in which aspects of the illustrative embodiments may be implemented.

FIG. 2 shows a block diagram of a data processing system in which aspects of the illustrative embodiments may be implemented. Data processing system 200 is an example of a computer, such as computer 100 in FIG. 1, in which code or instructions implementing the processes of illustrative embodiments may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java is a trademark of Sun Microsystems®, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments described herein provide for a method, apparatus, and computer usable program to adjust a display window along a dimension. The method includes displaying a display window on a desktop, the display window having a first boundary, a second boundary opposite the first boundary, a third boundary about perpendicular to the first boundary, and a fourth boundary opposite the third boundary. The method further includes receiving a resize command to resize the display window. Finally, the method includes, responsive to receiving the resize command, moving the first boundary with respect to a first window limit and moving the second boundary with respect to a second window limit. The distance between the third boundary and the fourth boundary remains fixed.

Figure 3:
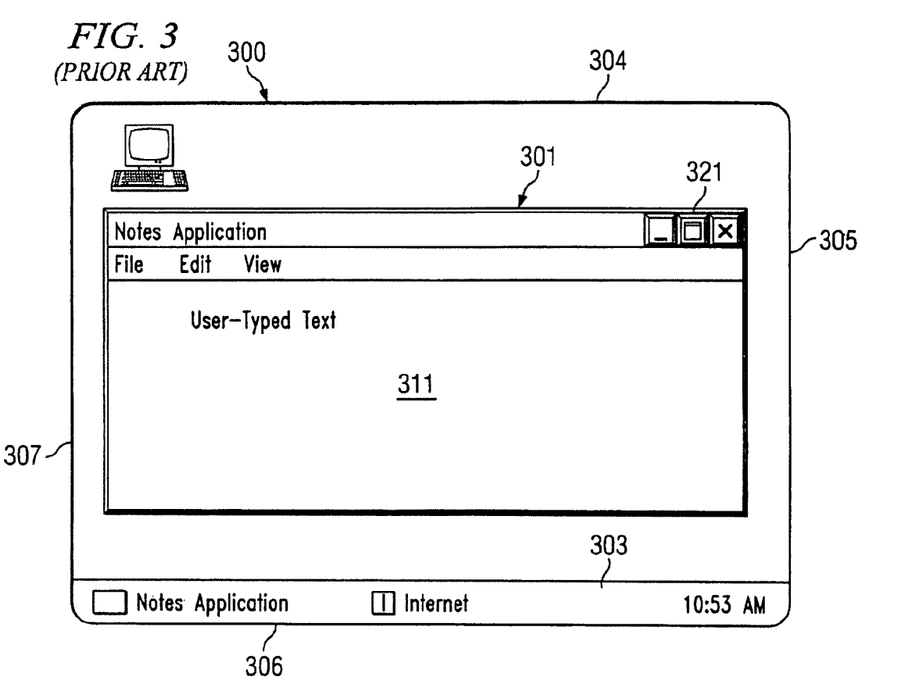
FIG. 3 is a diagram of a display showing a prior art display window.

FIG. 3 is a diagram of a prior art display window. A display window is a panel displayed on a display, such as a monitor. A data processing system controls how the panel is displayed. The data processing system also controls what is displayed within the display window. Thus, for example, a data processing system displays prior art display window 301 on display 300. Display window 301 occupies a portion of the display 300. In addition, display 300 frequently shows taskbar 303. Taskbar 303 provides icons that permit a user to trigger the data processing system to display a window related to the icon by clicking on the icon. For example, an icon on a taskbar can be a shortcut to a data file or an executable file.

Display 300 has four display edges. The display edges include top display edge 304, right display edge 305, bottom display edge 306, and left display edge 307. The terms "top", "bottom," "right," and "left," are relative to a user looking at the display while the computer is in normal operation. A display edge is a linear extent of a display window along an outermost line of pixels defining a display window boundary.

Within the display edges, display window 301 shows some content of interest to the user. For example, display window 301 displays content and user controls for a word processing program. Included in the display window is file display area 311, which contains user entered text.

Additionally, display window 301 contains maximize button 321. A user may click on maximize button 321 to maximize display window 301 to cover the entire display 300. Thus, a data processing system reacts to mouse clicks within maximize button 321 by expanding window 301 to cover display 300.

Figure 4A:
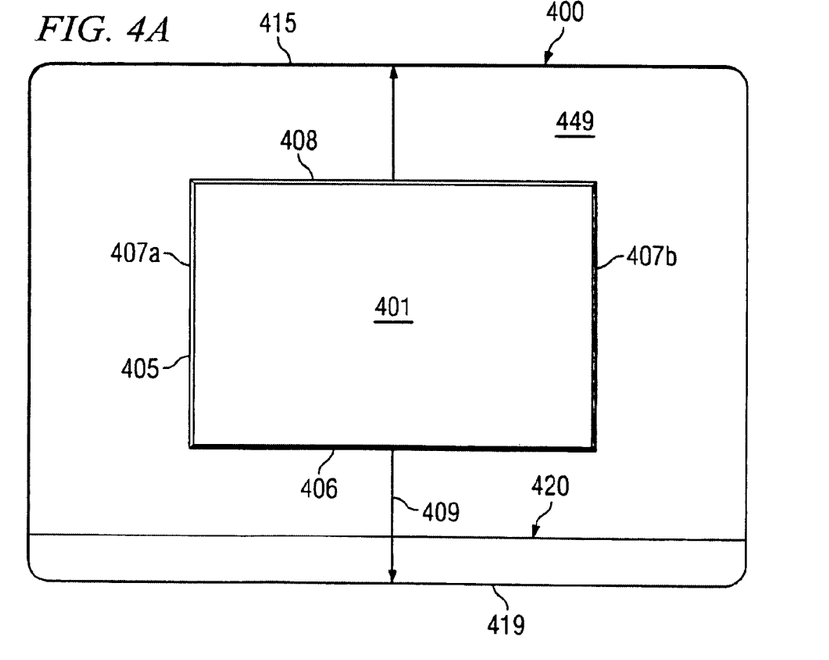
FIG. 4A is a diagram of a display with the lower display edge forming a window limit.

FIG. 4A is a diagram of a display window and directions of expansion of the display window in accordance with an illustrative embodiment. A data processing system can show display window 401 on display 400 using, for example, graphics processor 210 of FIG. 2. Display window 401 is shown within display 400. Display 400 has upper display edge 415 and lower display edge 419. Display window 401 has perpendicular boundary 405 and corresponding first boundary 406. Perpendicular boundary 405 is perpendicular with respect to first boundary 406. A window limit is the outermost edge of a display window within a display, when the display window is fully enlarged. For example, lower display edge 419 is a window limit. Alternatively, the window limit can be adjacent to an anchored screen element edge. An anchored screen element is a rectangular region of a display that abuts a display edge or abuts another anchored screen element.

The term "fully enlarged" is relative to the boundaries of the display, relative to anchored screen elements, or to both one or more boundaries of the display and one or more anchored screen elements. Thus, if a display window is fully enlarged, then the display window extends from a display boundary to a corresponding opposite display boundary, from an anchored screen element to a corresponding opposite anchored screen element, or from a display window to a corresponding opposite anchored screen element.

An operating system or other programs can show supplemental information in addition to display windows. One zone where such supplemental information is shown is an anchored screen element. An anchored screen element is, for example, taskbar 420, which corresponds to taskbar 303 in FIG. 3. A taskbar is a region of a display reserved for displaying predetermined information or icons, such as icons representing some active programs. A taskbar can also display icons which, if a user click on or activates the icon, can be used to execute an executable file or to access a data file. The taskbar is generally rectangular and displayed near the bottom of the display, but the taskbar can have different shapes and can be located on different portions of the display.

Users frequently resize display windows, possibly even the taskbar, using a resize command. A resize command is a signal received on a data processing system that operates as a trigger leading to further action. Further action includes modifying parallel boundaries of a display window along a dimension, while maintaining the distance between other boundaries.

For example, when a program that controls display window 401 receives a resize command, the program moves first boundary 406 along dimension 409. Dimension 409 can be referred to as the height of display window 401. The program may move first boundary 406 to lower display edge 419. In addition, the data processing system moves second boundary 408. Second boundary 408 is parallel to first boundary 406. The data processing system moves second boundary 408 in a direction opposite to the direction that the data processing system moves first boundary 406. However, in this illustrative example, the distance between boundary 407A and boundary 407B remains fixed even as the distance between boundary 408 and boundary 409 changes.

Further information may be displayed beyond display window 401 and taskbar 420. For example, display 400 includes region 449. Region 449 can be characterized as a group of unoccupied pixels. An unoccupied pixel is a pixel that is not among a collective group of pixels assigned to display a particular display window's content. The word 'unoccupied' modifies the word 'pixel' in relation to a display window. Thus, a 'display window unoccupied pixel' describes a pixel that is unoccupied by the collective group of pixels assigned to the display window. Similarly, 'taskbar unoccupied pixels' describe pixels that are unoccupied by the collective group of pixels assigned to the taskbar. Thus, region 449 is both window unoccupied pixels and taskbar unoccupied pixels.

Display window 401 is adjacent to at least one first line of display window unoccupied pixels. The term "display window unoccupied pixels" refers to those pixels on a display that are not occupied by display window 401. For example, to the left of display window 401 along perpendicular boundary 405 is a vertical line of display window unoccupied pixels. Following resizing of display window 401 along a height dimension, perpendicular boundary 405 will continue to remain adjacent to a line of display window unoccupied pixels.

Figure 4B:
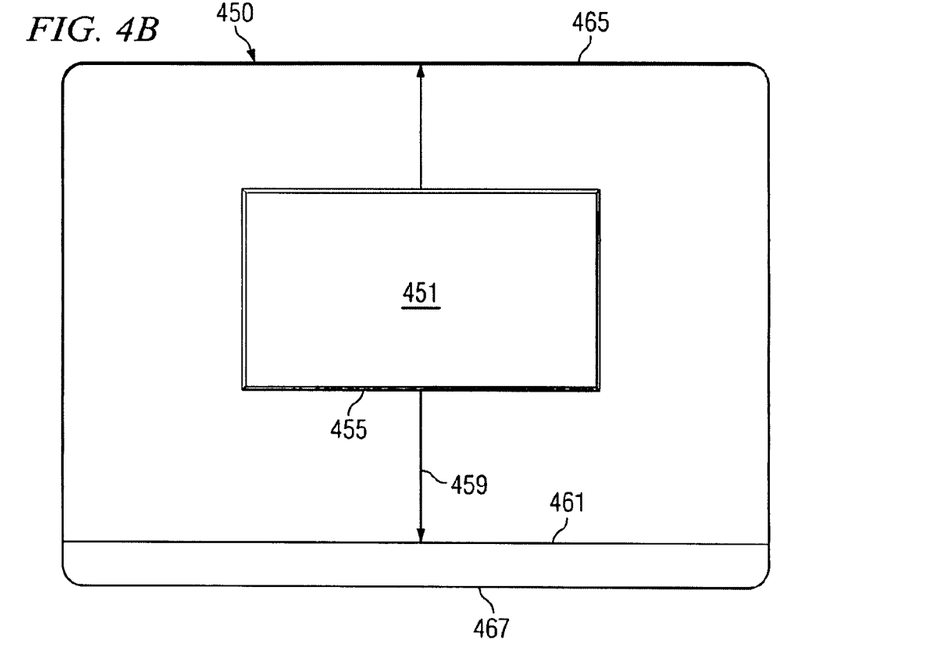
FIG. 4B is a diagram of a display with an anchored screen element, such as a tool bar, forming a window limit.

FIG. 4B is another diagram of a display window and directions of expansion of the display window in accordance with an illustrative embodiment. Display window 451 may be displayed by a data processing system on display 450 using, for example, graphics processor 210 of FIG. 2.

Unlike display 400 of FIG. 4A, display 450 operates differently. Display 450 has upper display edge 465 and lower display edge 467, which correspond to upper display edge 415 and lower display edge 419 in FIG. 4A. Display window 451 has boundary 455, which corresponds to boundary 406 in FIG. 4A. When a program receives a resize command, the program extends boundary 455 along a height dimension 459. However, the program only extends boundary 455 to anchored screen element edge 461. Anchored screen element edge 461 forms a window limit.

Thus, illustrative embodiments provide a computer implemented method, apparatus, and computer usable program to adjust a display window along a dimension. Adjusting along one dimension permits a user to leave tracts of space open on a desktop for programs other than that program controlling the display window. A user can obtain these advantages with one mouse click or with a keystroke combination.

Figure 5:
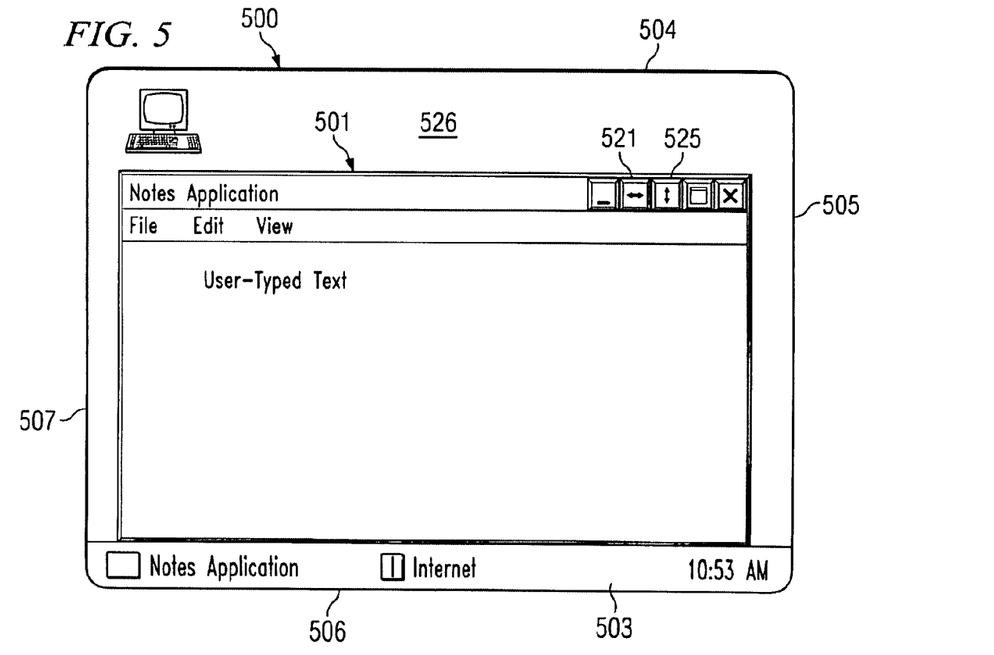
FIG. 5 is a diagram of a display desktop having a display window with a width maximize sizing button and a height maximize sizing button.

FIG. 5 is a diagram of a display desktop in accordance with an illustrative embodiment. Desktop 526 may be displayed onto display 500, using, for example, graphics processor 210 of FIG. 2 of a data processing system. Display 500 has upper display edge 504, right display edge 505, left display edge 507, and lower display edge 506. Lower display edge 506 is a window limit. Taskbar 503 abuts lower display edge 506.

Display 500 can show display window 501 as directed by a program executing on a data processing system. Display window 501 is not fully enlarged along any dimension. Display window 501 shows one or more sizing buttons, such as width maximize sizing button 521 and height maximize sizing button 525. If a user operates a mouse to click on a sizing button, the user has entered a resize command.

For example, a program detects a mouse click on width maximize sizing button 521 and responds by causing display window 501 to maximize along the selected dimension. In the case of width maximize sizing button 521, the selected dimension is width. However, in this illustrative example, the height of display window 501 remains fixed.

In another example, height maximize button 525 is a sizing button that also operates as a target for mouse clicks. A program detects a mouse click on height maximize button 525 and responds to maximize display window 501 along the selected dimension. In the case of height maximize button 525, the selected dimension is height. However, in this illustrative example, the width of display window 501 remains fixed.

In general, a sizing button is a region in a display where a program may accept mouse inputs to trigger a change in a window size. The sizing button can be represented by either a primary symbol or a secondary symbol. The primary symbol and the secondary symbol are suggestive of the function that the sizing button may trigger. For example, a fully enlarged sizing symbol can be a primary symbol. The primary symbol may appear as outward facing arrows, for example, as shown in height maximize button 525. The primary symbol may suggest a generally outward growth. A secondary symbol may suggest an inward collapse by reversing the direction of the arrows. The primary symbol suggests one function, whereas the secondary symbol suggests an opposing or complementary function. For example, the function of outwardly growing two window boundaries is a complementary function of inwardly collapsing window boundaries.

Figure 6:
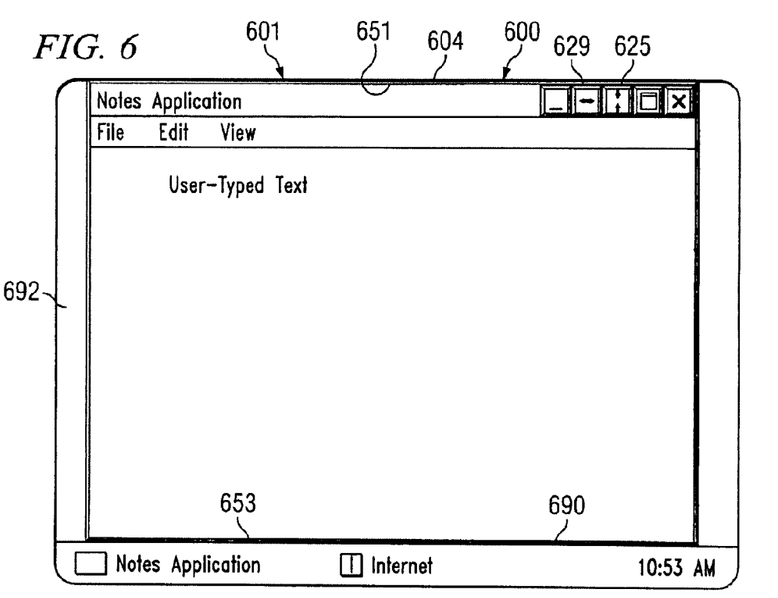
FIG. 6 is a diagram of a display desktop having a display window that has been height maximized.

FIG. 6 is a diagram of a display desktop in accordance with an illustrative embodiment. Display 692 can display desktop 600 using, for example, graphics processor 210 of FIG. 2 in a data processing system. As shown, display window 601 is maximized along a height dimension. Upper window boundary 651 abuts upper display edge 604. Lower window boundary 653 abuts anchored screen element edge 690.

FIG. 6 shows an alternate form of display window, as compared to display 500 in FIG. 5. Upon receiving a resize command to maximize display window 601 along a height dimension, the program converts a former symbol on a button to a new symbol. In this illustrative example, the new symbol is restore sizing symbol 625. Clicking on restore sizing symbol 625 causes the opposite result of clicking height maximize button 525 in FIG. 5. If a user clicks on restore sizing symbol 625, then the data processing system will cause display window 601 to assume its previous size along the height dimension, as shown in FIG. 5. Width maximize sizing button 629 remains unchanged by a command to resize the height dimension of display window 601. Similarly, the width of display window 601 remains fixed.

Figure 7:
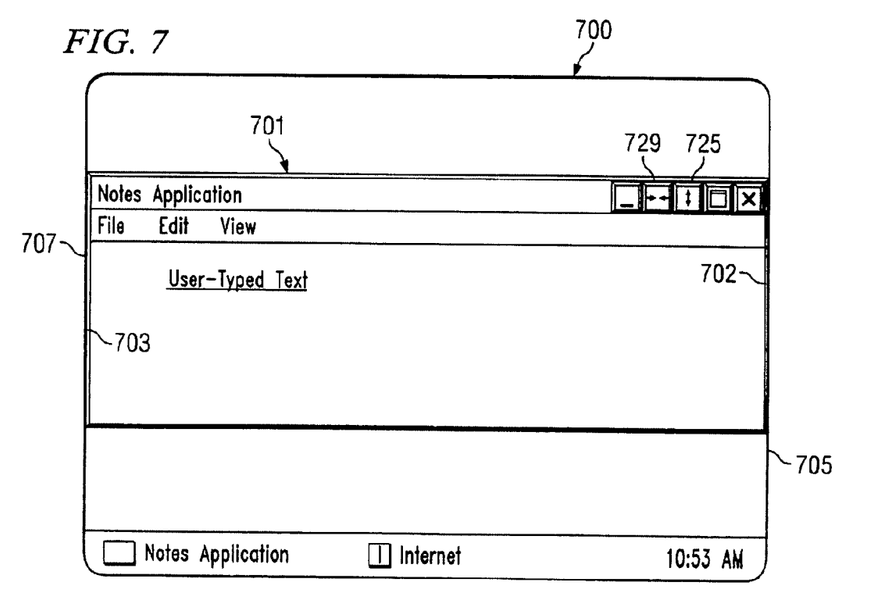
FIG. 7 is a diagram of a display desktop having a display window that has been width maximized.

FIG. 7 is a diagram of a display desktop in accordance with an illustrative embodiment. A data processing system can show display desktop 700 on a display using, for example, graphics processor 210 of FIG. 2 of a data processing system. A program can cause display desktop 700 to be displayed after receiving a resize command, for example, a resize width command. Display window 701 is maximized along a width dimension. Right window boundary 702 abuts right display edge 705. Left window boundary 703 abuts left display edge 707.

FIG. 7 shows an alternate form of display window, as compared to display 500 in FIG. 5. Upon receiving a resize command to maximize display window 701 along a width dimension, the program converts a former symbol on a button to a new symbol. In this illustrative example, the new symbol is restore sizing symbol 729. Clicking on restore sizing symbol 729 causes the opposite result of clicking on width maximize sizing button 629 in FIG. 6. If a user clicks on restore sizing symbol 729, then the data processing system will cause display window 701 to assume its previous size along the width dimension, as shown in FIG. 5. Height maximize sizing button 725 remains unchanged by a command to resize the width dimension of display window 701. Similarly, the width of display window 701 remains fixed.

Figure 8:
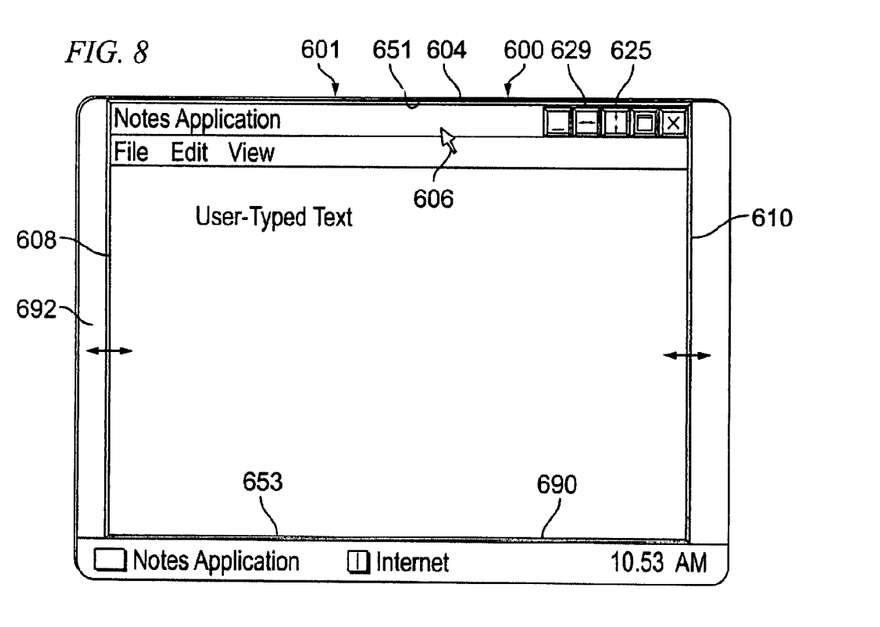
FIG. 8 is a diagram of a display desktop having a height maximized display window illustrating movement of the side rails of the display window.

FIG. 8 is a diagram of a display desktop having a height maximized display window 601, as in FIG. 6, illustrating movement of the side rails or boundaries 608, 610 of the display window 601. A reposition command is entered by the user and received by an application program or the operating system. The reposition command causes the third (left) and fourth (right) boundaries 608, 610 of the display window 601 to move while maintaining the fixed distance between the third and fourth boundaries 608, 610 and maintaining the position of the first (upper) and second (lower) boundaries 651, 653 with respect to the first and second window limits 604, 690. In other words, the first and second boundaries remain anchored. In a preferred embodiment, the reposition command includes positioning the mouse cursor 606 over the title bar of the display window 601 and performing a "click and drag" operation. With the display window height-maximized as shown, the invention only allows the third (left) and fourth (right) boundaries 608, 610 of the display window 601 to move in the same direction by the same distance. Accordingly, the title bar of a height maximized display window may be clicked and dragged to accomplish a purely leftward or purely rightward movement of the display window in its present size. Still, the window may be resized by a click and drag operation on either the left rail 608 or the right rail 610, or by clicking on any of the other resizing icons in the title bar.

Figure 9:
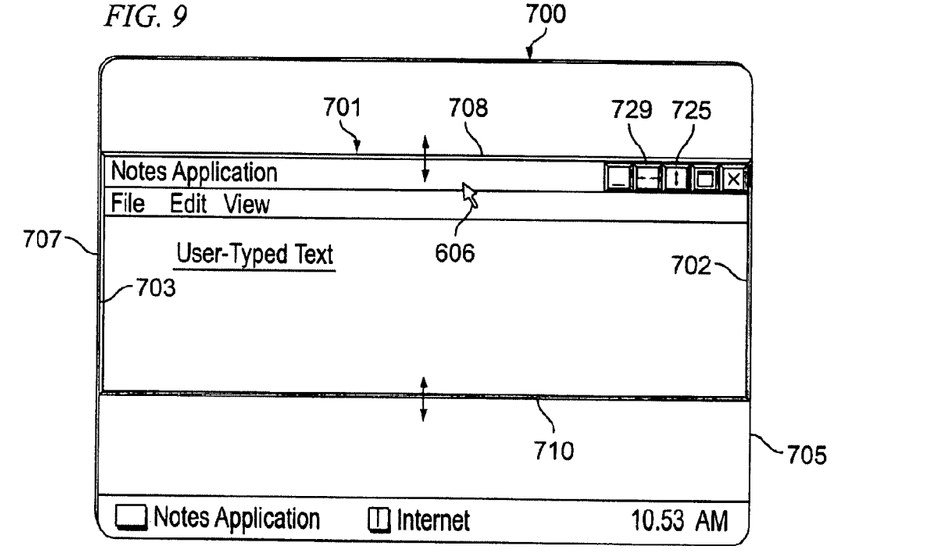
FIG. 9 is a diagram of a display desktop having a width maximized display window illustrating movement of the top and bottom rails of the display window.

FIG. 9 is a diagram of a display desktop having a width maximized display window, as in FIG. 7, illustrating movement of the top and bottom rails or boundaries 708, 710 of the display window 701. A reposition command is entered by the user and received by an application program or the operating system. The reposition command causes the first (upper) and second (lower) boundaries 708, 710 of the display window 701 to move while maintaining the fixed distance between the first and second boundaries 708, 710 and maintaining the position of the third (left) and fourth (right) boundaries 703, 702 with respect to the left and right window limits 707, 705. In other words, the third and fourth boundaries remain anchored. In a preferred embodiment, the reposition command includes positioning the mouse cursor 606 over the title bar of the display window 701 and performing a "click and drag" operation. With the display window width maximized as shown, the invention only allows the first (upper) and second (lower) boundaries 708, 710 of the display window 701 to move in the same direction by the same distance. Accordingly, the title bar of a height maximized display window may be clicked and dragged to accomplish a purely upward or purely downward movement of the display window in its present size. Still, the window may be resized by a click and drag operation on either the upper rail 708 or the lower rail 710, or by clicking on any of the other resizing icons in the title bar.

It should be recognized that the function of resizing a window to be height maximized or width maximized, or the function of repositioning a height maximized window or a width maximized window, in accordance with the invention, may optionally be enabled or disabled system wide by editing the user preferences within the operating system. In this manner, the enhanced resizing and repositioning abilities of the present invention can be enabled or disabled as to all windows, or certain applications. Furthermore, the resizing and repositioning functions of the present invention may be implemented in various graphical user interfaces, such as desktop metaphor systems. While the invention has been described and shown in the Figures in a two dimensional (2D) desktop configuration such as WINDOWS XP, the invention may also be implemented in a three dimensional (3D) desktop configuration such as WINDOW FLIP 3D (WINDOWS XP and WINDOWS FLIP 3D are trademarks of Microsoft Corporation, Seattle, Wash.). Implementation in a 3D desktop allows an application window to be "swung back" along an edge to provide a 3D look and take up less desktop space, yet the 3D window may still be maximized along one or more edge. Even live thumbnails images of a window (which may be invoked with an ALT+TAB command) or taskbar thumbnail images of a window (which may be invoked by rolling the mouse over a taskbar icon) may visually show whether the window has been height maximized or width maximized.

Figure 10A:
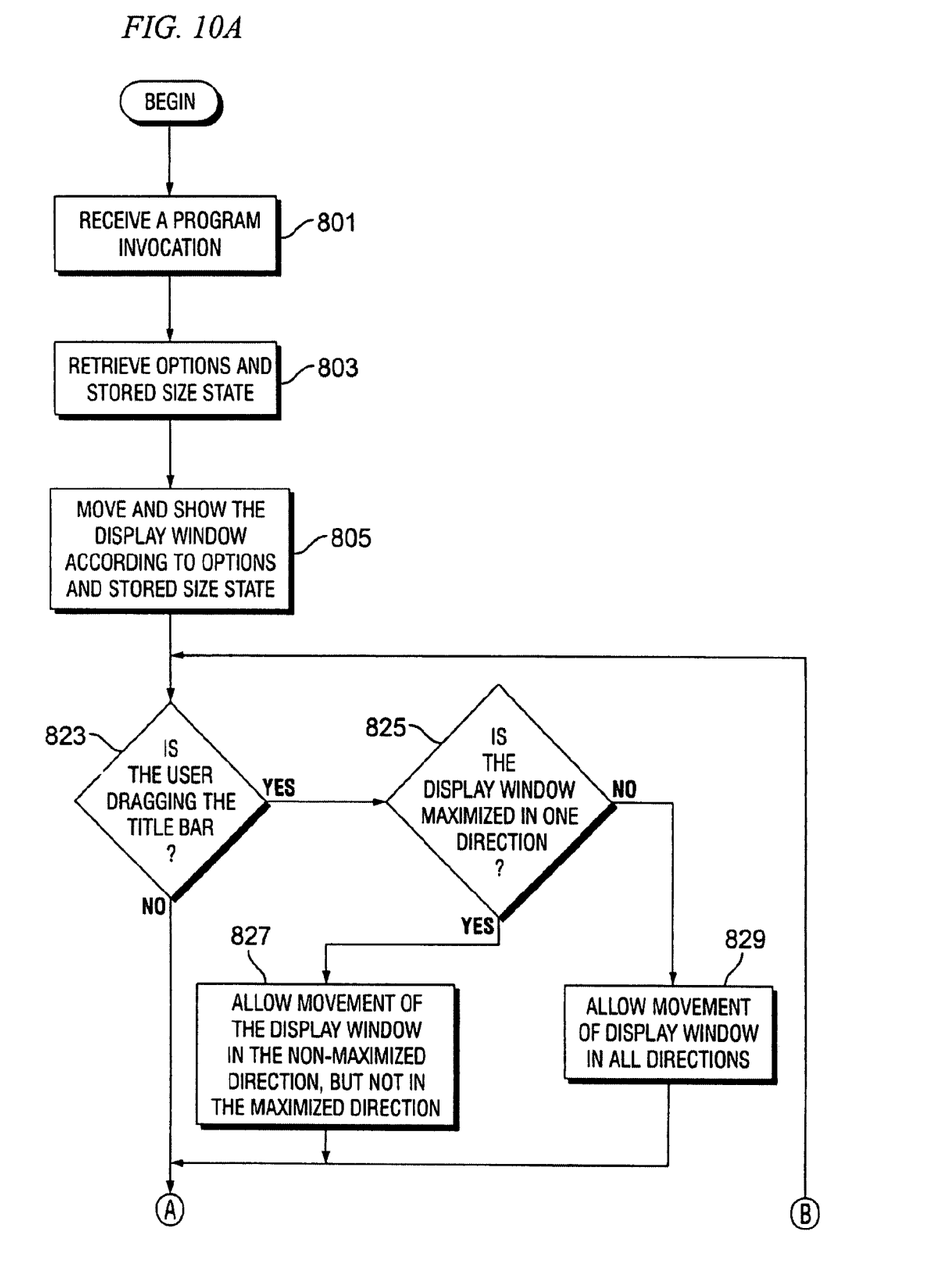
FIGS. 10A and 10B provide a flowchart of steps executed on a data processing system in accordance with an illustrative embodiment.
Figure 10B:
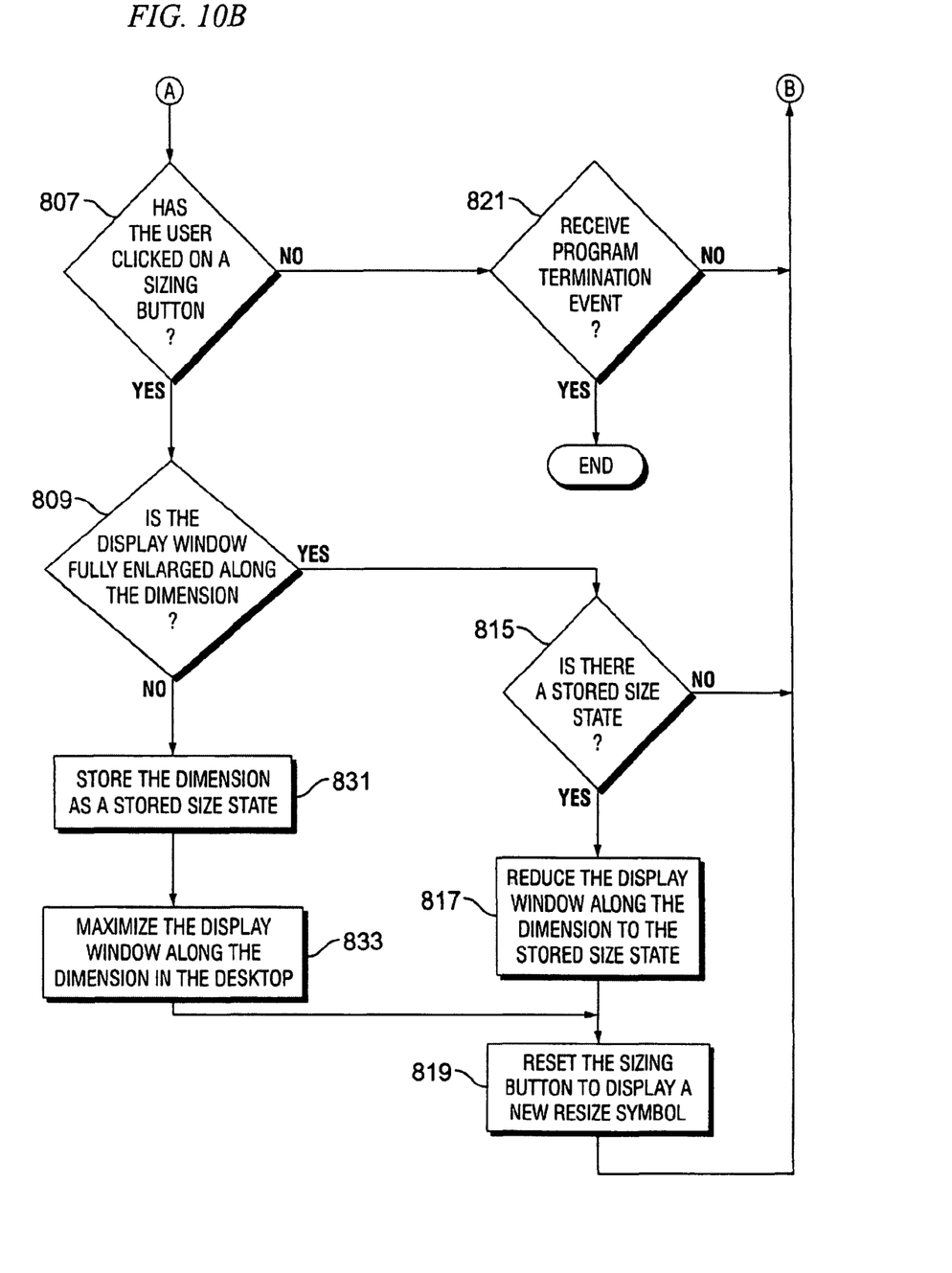

FIGS. 10A and 10B provide a flowchart of steps executed on a data processing system in accordance with an illustrative embodiment. The data processing system may be, for example, data processing system 200 of FIG. 2. The process shown in FIGS. 10A and 10B describes height and width maximizing a display window, as described with respect to FIG. 3 through FIG. 7, as well as the movement of a height or width maximized display window, as described with respect to in FIGS. 8 and 9.

Initially, a user invokes a program. A program can be invoked when the user clicks on an icon on a desktop. Such program invocations can also occur when a user enters a command on a command line. In addition, such program invocations can also occur when a user executes a keystroke combination. A program can be invoked using other input commands. However a program is invoked, the program operates according to its programming until terminated.

Some functions of a program may rely upon the operating system to execute such functions. Consequently, a step performed by a program may involve further execution by the operating system. Similarly, an operating system can receive user input and pass the user input to the program for further processing.

However, the program is invoked, the program receives a program invocation (step 801). The program responds by retrieving options and a stored size state (step 803). Options reflect possible new sizes of the display window. A stored size state is a virtual object size associated with a display window or program prior to program invocation. The stored size state retains a size along a dimension that a display window had prior to extending the display window to a window display limit. The stored size state may include boundary positions, for example, an upper boundary position, a lower boundary position, a left boundary position, and a right boundary position. Such boundary positions may be expressed in a number of pixels distant from a reference point on a display.

Next, the program moves and shows the display window according to the options and the stored size state (step 805). The program determines whether the user is dragging the title bar (step 823). If so, then the program determines whether the display window is maximized in one direction (step 825), i.e., height maximized or width maximized. Dragging a title bar of a display window that is maximized in one direction, causes the program to allow movement of the display window in the non-maximized direction, but not in the maximized direction (step 827). In other words, the title bar of a height maximized display window could only drag the display window left or right and the title bar of a width maximized display window could only drag the display window upward or downward. By contrast, a title bar of a display window that is not maximized in one direction can be dragged to allow movement of the display window in all directions (step 829).

The program continues by determining whether the program has received a resize command. For example, the program determines whether the user has clicked on a sizing button (step 807). If not, the program then determines if the program has received a program termination event (step 821). A negative result to step 821 causes the program to re-execute step 807. However, if the program determines that the program has received a program termination event at step 821, the process terminates.

Returning to step 807, if the user has clicked on a sizing button (a 'yes' output to step 807), the program determines whether the display window is fully enlarged along the dimension associated with the sizing button (step 809).

In any case, an affirmative result at step 809 prompts the program to determine whether a stored size state exists (step 815). If no stored size state is found (a 'no' output at step 815), the program returns to step 807. An affirmative result at step 815 prompts the program to cause the display window to be reduced along the dimension to the stored size state (step 817). In addition, the program resets the sizing button to display a new resize symbol (step 819). For example, if the sizing button had previously shown arrows converging in the up and down directions, the program may instead cause a symbol that includes arrows diverging in the up and down directions to be displayed. The program resumes by re-executing step 807.

Occasionally, a user may desire to maximize a display window along a single dimension. Thus, a negative determination to step 809 prompts the program to store the dimension as a stored size state (step 831). Next, the program maximizes the display window along the dimension in the desktop corresponding to the sizing button selected (step 833). However, the other dimension of the display window remains fixed. The program may maximize the display window to the full extent of a display. Alternatively, the program may maximize the display window to the full extent of the desktop, less any anchored screen elements such as a taskbar. Next, the program resets the sizing button to display a new resizing symbol (step 819). In this case, the display resize symbol is complementary to a formerly displayed resize symbol. The complementary resize symbol to outward faced arrows is a symbol of inward faced arrows. Following step 819, the program resumes by re-executing step 823.

The illustrative examples described herein have several advantages over the known art of displaying display windows on a display of a data processing system. For example, a user can readily enlarge a display window fully along a single dimension. Similarly, a program may retain the former window size in that dimension. The program may restore the display window to the window size in response to receiving a further resize command. A further advantage of these functions is that a user has easy access to information displays in display window unoccupied pixels. Still further, when a display window is fully enlarged along a single dimension, such as a height maximized or width maximized display window, then the display window may be moved in the other non-maximized dimension without altering the fully enlarged single dimension.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for adjusting a display window, the computer implemented method comprising:
    displaying the display window on a desktop, the display window having a first boundary, a second boundary opposite the first boundary, a third boundary about perpendicular to the first boundary, and a fourth boundary opposite the third boundary;
    receiving a resize command to resize the display window in response to a user selecting a width maximize sizing button or a height maximize sizing button;
    responsive to receiving the resize command, moving the first boundary with respect to a first window limit and moving the second boundary with respect to a second window limit, wherein the distance between the third boundary and the fourth boundary remains fixed;
    receiving a reposition command to reposition the resized display window in response to a user performing a click and drag operation in a title bar of the resized display window; and
    responsive to receiving the reposition command, moving the third and fourth boundaries of the resized display window while maintaining the fixed distance between the third and fourth boundaries and maintaining the position of the first and second boundaries with respect to the first and second window limits.

2. The computer implemented method of claim 1, further comprising:
    retrieving a stored size state associated with the display window;
    reducing the distance between the first boundary and the second boundary, in response to a determination that a stored size state is associated with the dimension; and
    resetting a sizing button to display a resize symbol.

3. The computer implemented method of claim 1, wherein a distance between the first boundary and the second boundary comprises one of a height of the display window, a distance between anchored screen elements, and a distance between a display boundary and an anchored screen element.

4. The computer implemented method of claim 1, wherein a distance between the first boundary and the second boundary comprises one of a width of the display window, a distance between anchored screen elements, and a distance between a display boundary and an anchored screen element.

5. The computer implemented method of claim 1, wherein the step of receiving a resize command occurs in response to a user selecting a width maximize sizing button.

6. The computer implemented method of claim 1, wherein the step of receiving a resize command occurs in response to a user selecting a height maximize sizing button.

7. A computer program product, comprising computer executable instructions embodied in a computer usable storage medium, for adjusting a display window, the computer program product comprising:
    computer usable program code for displaying the display window on a desktop, the display window having a first boundary, a second boundary opposite the first boundary, a third boundary about perpendicular to the first boundary, and a fourth boundary opposite the third boundary;
    computer usable program code for receiving a resize command to resize the display window in response to a user selecting a width maximize sizing button or a height maximize sizing button;

computer usable program code for, responsive to receiving the resize command, moving the first boundary with respect to a first window limit and moving the second boundary with respect to a second window limit, wherein the distance between the third boundary and the fourth boundary remains fixed;

computer usable program code for receiving a reposition command to reposition the resized display window in response to a user performing a click and drag operation in a title bar of the resized display window; and computer usable program code for, responsive to receiving the reposition command, moving the third and fourth boundaries of the resized display window while maintaining the fixed distance between the third and fourth boundaries and maintaining the position of the first and second boundaries with respect to the first and second window limits.

8. The computer program product of claim 7, further comprising:

computer usable program code. for retrieving a stored size state associated with the display window;

computer usable program code for reducing the distance between the first boundary and the second boundary, in response to a determination that a stored size state is associated with the dimension; and computer usable program code for resetting a sizing button to display a resize symbol.

9. The computer program product of claim 7, wherein a distance between the first boundary and the second boundary comprises one of a height of the display window, a distance between anchored screen elements, and a distance between a display boundary and an anchored screen element.

10. The computer program product of claim 7, wherein a distance between the first boundary and the second boundary comprises one of a width of the display window, a distance between anchored screen elements, and a distance between a display boundary and an anchored screen element.

11. The computer program product of claim 7, wherein the computer usable program code for receiving a resize command is responsive to a user selecting a width maximize sizing button.

12. The computer program product of claim 7, wherein the computer usable program code for receiving a resize command occurs is responsive to a user selecting a height maximize sizing button.

13. A data processing system comprising:
a processor;
a bus connected to the processor;
a computer usable medium connected to the bus, wherein the computer usable medium contains a set of instructions for adjusting a display window, wherein the processor is adapted to carry out the set of instructions to:

display the display window on a desktop, the display window having a first boundary, a second boundary opposite the first boundary, a third boundary about perpendicular to the first boundary, and a fourth boundary opposite the third boundary;

receive a resize command to resize the display window in response to a user selecting a width maximize sizing button or a height maximize sizing button;

responsive to receiving the resize command, move the first boundary with respect to a first window limit and move the second boundary with respect to a second window limit, wherein the distance between the third boundary and the fourth boundary remains fixed;

receive a reposition command to reposition the resized display window in response to a user performing a click and drag operation in a title bar of the resized display window; and responsive to receiving the reposition command, move the third and fourth boundaries of the resized display window while maintaining the fixed distance between the third and fourth boundaries and maintain the position of the first and second boundaries with respect to the first and second window limits.

14. The data processing system of claim 13, wherein the processor is further adapted to carry out the set of instructions to:

retrieve a stored size state associated with the display window;

reduce the distance between the first boundary and the second boundary, in response to a determination that a stored size state is associated with the dimension; and reset a sizing button to display a resize symbol.

15. The data processing system of claim 13, wherein a distance between the first boundary and the second boundary comprises one of a height of the display window, a distance between anchored screen elements, and a distance between a display boundary and an anchored screen element.

16. The data processing system of claim 13, wherein a distance between the first boundary and the second boundary comprises one of a width of the display window, a distance between anchored screen elements, and a distance between a display boundary and an anchored screen element.

17. The data processing system of claim 13, wherein receipt of the resize command is responsive to a user selecting one of a width maximize sizing button and a height maximize sizing button.

* * * * *